United States Patent
Pi

(10) Patent No.: US 9,489,292 B2
(45) Date of Patent: Nov. 8, 2016

(54) DEVICES AND METHODS FOR ACQUIRING ABNORMAL INFORMATION

(71) Applicant: Tencent Technology (Shenzhen) Company Limited, Shenzhen (CN)

(72) Inventor: Kai Pi, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/597,276

(22) Filed: Jan. 15, 2015

(65) Prior Publication Data

US 2015/0128111 A1    May 7, 2015

Related U.S. Application Data

(63) Continuation of application No. PCT/CN2014/084207, filed on Aug. 12, 2014.

(30) Foreign Application Priority Data

Aug. 26, 2013 (CN) .......................... 2013 1 0376283

(51) Int. Cl.
| | |
|---|---|
| G06F 9/45 | (2006.01) |
| G06F 11/36 | (2006.01) |
| H04B 17/17 | (2015.01) |
| H04B 17/23 | (2015.01) |

(52) U.S. Cl.
CPC ....... *G06F 11/3692* (2013.01); *G06F 11/3664* (2013.01); *G06F 11/3684* (2013.01); *G06F 11/3688* (2013.01); *H04B 17/17* (2015.01); *H04B 17/23* (2015.01)

(58) Field of Classification Search
None
See application file for complete search history.

(56) References Cited

U.S. PATENT DOCUMENTS

| | | | |
|---|---|---|---|
| 2007/0079288 A1 | 4/2007 | Willwerth et al. | |
| 2011/0145653 A1* | 6/2011 | Broadfoot | G06F 11/3604 714/38.1 |

FOREIGN PATENT DOCUMENTS

| | | |
|---|---|---|
| CN | 101765084 A | 6/2010 |
| CN | 102075789 A | 5/2011 |

OTHER PUBLICATIONS

Patent Cooperation Treaty, International Search Report, PCT/CN2014/084207, mailed Nov. 15, 2014.
Patent Cooperation Treaty, Written Opinion of the International Searching Authority, PCT/CN2014/084207, mailed Nov. 18, 2014.
Patent Cooperation Treaty, International Preliminary Report on Patentability, PCT/CN2014/084207, issued Mar. 1, 2016.

* cited by examiner

*Primary Examiner* — Chuck Kendall
(74) *Attorney, Agent, or Firm* — Jones Day

(57) ABSTRACT

Devices and methods are provided for acquiring abnormal information. For example, a test command line is generated using one or more data processors based on at least information associated with test demand information; the generated test command line is run using the data processors to send a test instruction to execute a test of a condition associated with the demand information; a test log is monitored using the data processors; keyword identification is performed using the data processors on the test log; and in response to one or more test abnormal keywords existing in the test log based on at least information associated with the keyword identification, abnormal information associated with the abnormal keywords is extracted using the data processors from the test log.

19 Claims, 7 Drawing Sheets

DEVICES AND METHODS FOR ACQUIRING ABNORMAL INFORMATION

CROSS-REFERENCES TO RELATED APPLICATIONS

This application is a continuation of International Application No. PCT/CN2014/084207, with an international filing date of Aug. 12, 2014, now pending, which claims priority to Chinese Patent Application No. 201310376283.5, filed Aug. 26, 2013, both applications being incorporated by reference herein for all purposes.

BACKGROUND OF THE INVENTION

Certain embodiments of the present invention are directed to computer technology. More particularly, some embodiments of the invention provide systems and methods for information processing. Merely by way of example, some embodiments of the invention have been applied to abnormal information. But it would be recognized that the invention has a much broader range of applicability.

After intelligent computer applications are created, tests are often performed on the application programs, including not only a common functional test, but also a pressure test. During the pressure test, an application program installed on a device is usually tested by simulations of user operations, such as touching a screen, sliding, pressing a key, clicking, etc., so as to detect the circumstances under which the application program operates abnormally and/or detect the time period after which the application program begins to operate abnormally.

If a failure or a mistake occurs in an application program during a pressure test process, a test user often determines a log record corresponding to the failure of the application program in a system log, and obtains relevant abnormal information for analysis, so as to improve the application program. The above-noted conventional technology has some disadvantages. For example, since the system log includes a great deal of information, such as normal log information, the user usually needs to spend a lot of time in searching, and an omission is likely to occur in searching, which does not help improving the application program.

Hence it is highly desirable to improve the techniques for acquiring abnormal information.

BRIEF SUMMARY OF THE INVENTION

According to one embodiment, a method is provided for acquiring abnormal information. For example, a test command line is generated using one or more data processors based on at least information associated with test demand information; the generated test command line is run using the data processors to send a test instruction to execute a test of a condition associated with the demand information; a test log is monitored using the data processors; keyword identification is performed using the data processors on the test log; and in response to one or more test abnormal keywords existing in the test log based on at least information associated with the keyword identification, abnormal information associated with the abnormal keywords is extracted using the data processors from the test log.

According to another embodiment, a device for acquiring abnormal information includes: a test running module configured to generate a test command line based on at least information associated with test demand information and run the generated test command line to send a test instruction to execute a test of a condition associated with the demand information; an identification module configured to monitor a test log and perform keyword identification on the test log; and an extraction module configured to, in response to one or more test abnormal keywords existing in the test log based on at least information associated with the keyword identification, extract abnormal information associated with the abnormal keywords from the test log.

According to yet another embodiment, an intelligent terminal includes a device for acquiring abnormal information. The device includes: a test running module configured to generate a test command line based on at least information associated with test demand information and run the generated test command line to send a test instruction to execute a test of a condition associated with the demand information; an identification module configured to monitor a test log and perform keyword identification on the test log; and an extraction module configured to, in response to one or more test abnormal keywords existing in the test log based on at least information associated with the keyword identification, extract abnormal information associated with the abnormal keywords from the test log.

According to yet another embodiment, a non-transitory computer readable storage medium includes programming instructions for acquiring abnormal information. The programming instructions are configured to cause one or more data processors to execute certain operations. For example, a test command line is generated based on at least information associated with test demand information; the generated test command line is run to send a test instruction to execute a test of a condition associated with the demand information; a test log is monitored; keyword identification is performed on the test log; and in response to one or more test abnormal keywords existing in the test log based on at least information associated with the keyword identification, abnormal information associated with the abnormal keywords is extracted from the test log.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
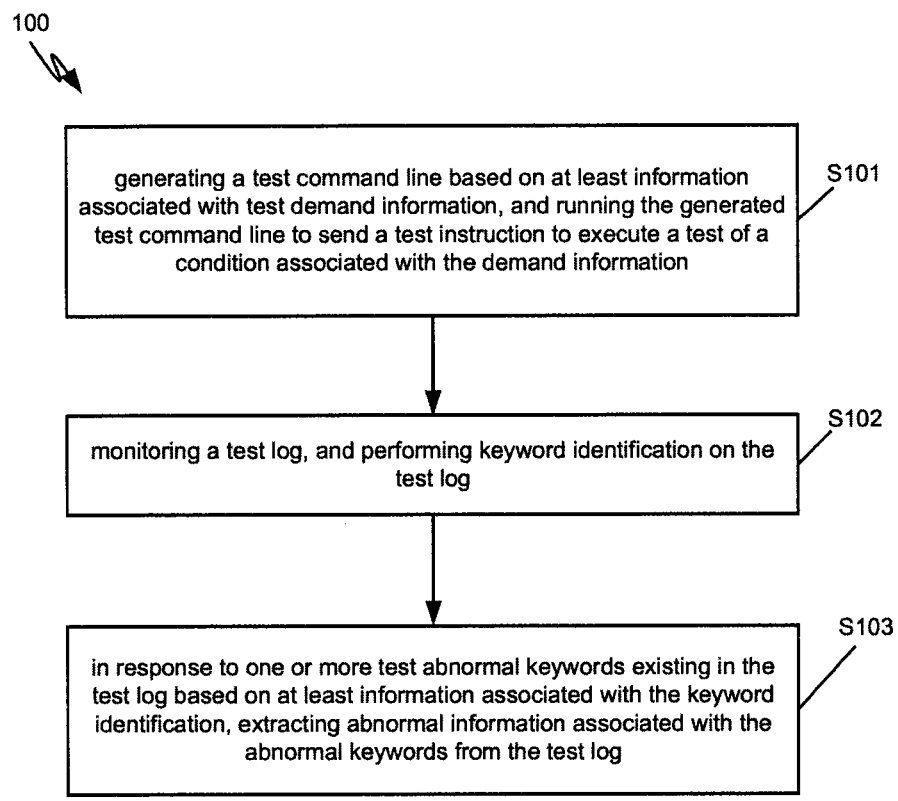
FIG. 1 is a simplified diagram showing a method for acquiring abnormal information according to one embodiment of the present invention.

FIG. 1 is a simplified diagram showing a method for acquiring abnormal information according to one embodiment of the present invention. The diagram is merely an example, which should not unduly limit the scope of the claims. One of ordinary skill in the art would recognize many variations, alternatives, and modifications. The method 100 includes at least processes S101-S103.

According to one embodiment, the method 100 is applied to an intelligent terminal, such as a smart phone, a tablet computer and a smart wearable device. For example, the method 100 is applied to one or more servers configured to test an application program of an intelligent terminal, so as to test a created application program and automatically extract abnormal information in a testing process. According to another embodiment, the process S101 includes: generating a test command line by assembling test demand information and running the generated test command line to send out a test instruction to execute a test of a condition indicated by the demand information. For example, the test demand information input by a user can be assembled based on an existing common command line tool. As an example, the user can be prompted to input the corresponding test demand information via a human-computer interaction interface. In another example, if a test mode based on a Monkey command line tool is adopted, one or more input boxes (e.g., corresponding to test time, test object, interval time between events, event proportion, etc.) are provided for a user to directly input corresponding information. The Monkey command line tool is used to send a random user event flow to perform a pressure test on an application program being developed, according to some embodiments.

According to some embodiments, after the corresponding test command line is obtained by assembling the test demand information, the test instruction can be sent out by calling the corresponding command line tool, and the test of the condition indicated by the demand information is executed. For example, the tested application program is enabled to execute an operation and respond based on the user event flow corresponding to the demand information of the user.

In one embodiment, the process S102 includes: monitoring a test log, and performing keyword identification on the content of the test log. For example, in a testing process of the application program, tested relevant log information is recorded in a log, such as a Logcat log including log information associated with an Android platform, a Monkey log, an ANR (Application Not Responding) log, etc. In another example, abnormal information of the target application program during the test can be conveniently extracted out from all types of logs by identifying keywords in real time or at a short time interval, and the keywords are preset for representing abnormal information recorded in the logs when abnormity (e.g., abnormal situations, abnormal events) occurs during the testing process of a target application program.

In another embodiment, the process S103 includes: if one or more test abnormal keywords exist in the test log according to the keyword identification, extracting information associated with the abnormal keywords in the test log and taking the information as abnormal information. According to some embodiments, information (e.g., data, message) including the abnormal keywords can be copied, extracted and saved as abnormal information. For example, as for the Logcat log, some abnormal keywords can be preset. When a preset abnormal keyword in a log that includes the process name of a currently tested target application program exists in the Logcat log, information including the keyword is taken as abnormal information of the target application program, and the abnormal information is extracted and saved in a form of C-layer abnormal information into a database. In another example, as for the Monkey log, a "CRASH" field is taken as a keyword. When a "CRASH" field including the process name of the currently tested target application program exists, the "CRASH" field is taken as abnormal information of the target application program, and is saved in a form of java-layer abnormal information into the database. In yet another example, as for the ANR log, an ANR field is taken as an abnormal keyword. When an ANR field including the process name of the currently tested target application program exists, the ANR field is taken as abnormal information of the target application program. A relevant anr file in a terminal is exported and taken as abnormal information that is saved in a form of ANR into the database. In yet another embodiment, after the abnormal information is extracted or the test is completed, acquired information can be displayed to the user via a display interface.

According to certain embodiments, the test demand information is assembled to generate the test command line for testing an application, and abnormal information in the test log is extracted based on keyword identification. For example, an abnormal situation of the relevant application program is obtained more quickly, accurately and timely. Thus, it saves time that often needs to be spent in manually determining abnormal information of an application program in the test from a log that includes multiple application programs, avoids omission of the abnormal information, and facilitates improvement of the application program, according to some embodiments.

Figure 2:
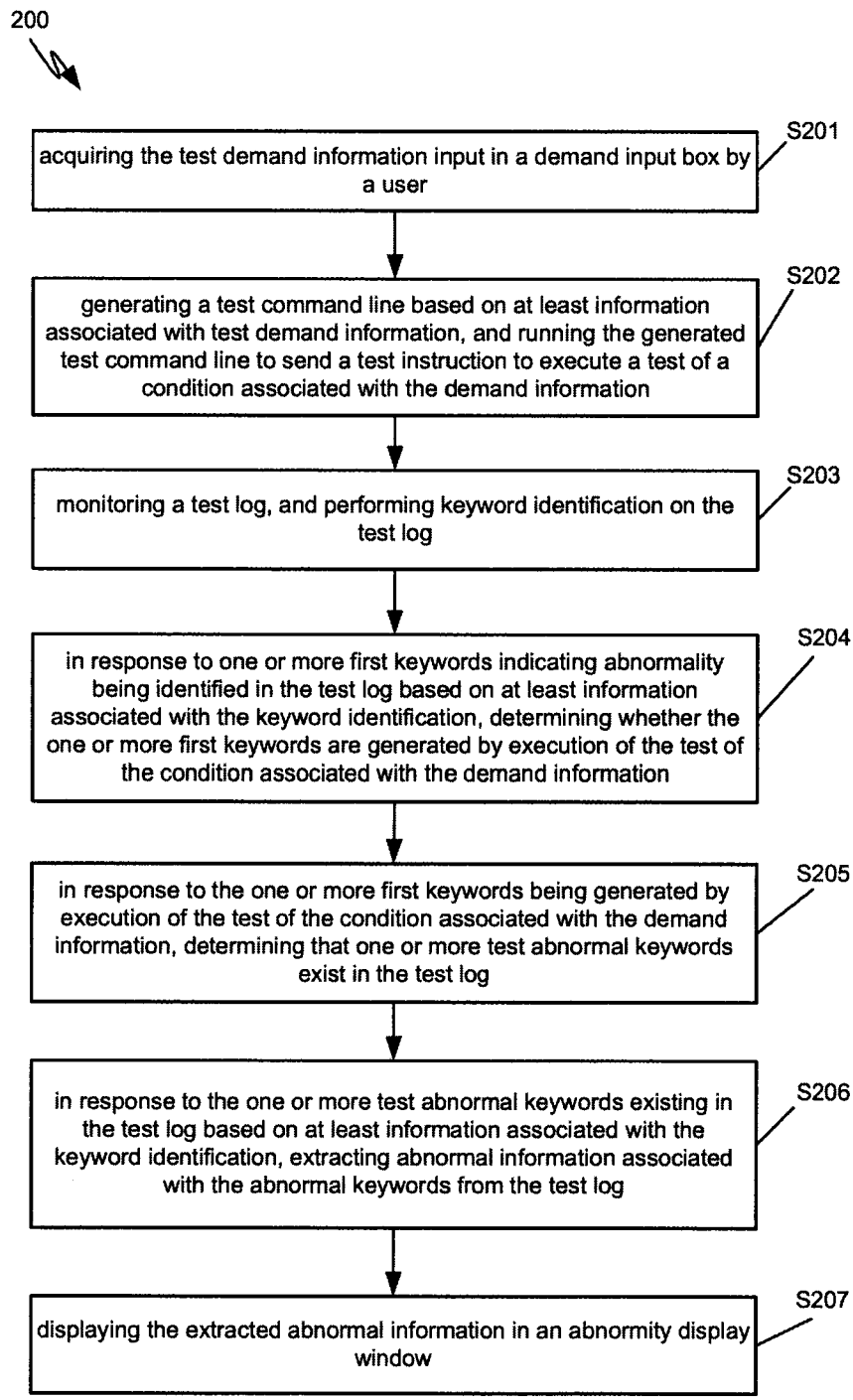
FIG. 2 is a simplified diagram showing a method for acquiring abnormal information according to another embodiment of the present invention.

FIG. 2 is a simplified diagram showing a method for acquiring abnormal information according to another embodiment of the present invention. The diagram is merely an example, which should not unduly limit the scope of the claims. One of ordinary skill in the art would recognize many variations, alternatives, and modifications. The method 200 includes at least processes S201-S207.

According to one embodiment, the method 200 is applied to an intelligent terminal, such as a smart phone, a tablet computer and a smart wearable device. For example, the method 200 is applied to one or more servers configured to test an application program of an intelligent terminal, so as to test a created application program and automatically extract abnormal information in a testing process. According to another embodiment, the process S201 includes: acquiring test demand information input in a demand input box by a user. For example, a human-computer interface is set to acquire test information input by the user. In another example, the human-computer interface includes a prompt interface in order to subsequently display abnormal information of a tested target application program in the interface. In yet another example, the prompt interface includes a single interface. In yet another example, a pressure test is performed based on a Monkey command line tool. As an example, the test demand information acquired in the process S201 includes: test time information, test object information, interval information and event proportion information, etc.

According to yet another embodiment, the process 5202 includes: generating a test command line by assembling test demand information and running the generated test command line to send out a test instruction to execute a test of a condition associated with the demand information. For example, a random user event flow is sent out, and corresponds to the test demand information to a terminal system according to the test command line, so as to test the content associated with test object information. As an example, the random user event flow includes: a touch event, a clicking event, a sliding event, etc. and other user time.

In one embodiment, the process S203 includes: monitoring a test log and performing keyword identification on the content of the test log. For example, the keywords are preset for marking abnormal information in all types of logs. As an example, the keywords include certain default keywords. As another example, the keywords are set by the user via a user interface. In another embodiment, the process S204 includes: if a keyword indicating that the abnormity exists in the test log in a keyword identification process, judging whether the keyword indicating the abnormity is generated by execution of the test of the condition associated with the demand information.

In yet another embodiment, the process 5205 includes: in response to the keyword indicating the abnormity being generated by execution of the test of the condition associated with the demand information, determining that the test abnormal keyword exists in the test log. For example, as for a Logcat log, an abnormal keyword is set. When the test log includes the Logcat log, whether an abnormal information keyword exists in the Logcat log is judged. If the abnormal information keyword exists, whether the keyword indicating the abnormity is generated due to execution of the test of the condition indicated by the demand information is further judged. If the keyword indicating the abnormity is generated due to execution of the test of the condition indicated by the demand information, the test abnormal keyword is determined to exist in the test log. In another example, as for a Monkey log, a CRASH field is taken as an abnormal keyword. When the test log includes the Monkey log, whether a CRASH field exists in the Monkey log is judged. If the CRASH field exists, whether the CRASH field is generated due to execution of the test of the condition indicated by the demand information is further judged. If the CRASH field is generated due to execution of the test of the condition indicated by the demand information, the test abnormal keyword is determined to exist in the test log. In yet another example, as for an ANR log, an ANR field for representing the abnormity of a response is taken as an abnormal keyword. When the test log includes the ANR log, whether an ANR field for representing the abnormity of a response exists in the ANR log is judged. If the ANR field for representing the abnormity of the response exists, whether the ANR field for representing the abnormity of the response is generated due to execution of the test of the condition indicated by the demand information is further judged. If the ANR field for representing the abnormity of the response is generated due to execution of the test of the condition indicated by the demand information, the test abnormal keyword is determined to exist in the test log.

According to some embodiments, whether abnormal information (e.g., including a field of the keyword, the CRASH field and/or the ANR field to represent the abnormity of the response) is generated due to execution of the test of the condition indicated by the demand information is judged by judging whether the abnormal information includes the process name of a currently tested target application program. For example, if the abnormal information includes the process name of the currently tested target application program, the abnormal information is determined to be generated due to execution of the test of the condition indicated by the demand information. Otherwise, the abnormal information may be abnormal information of other application programs in a terminal system, and is not required to be extracted. During the process 5205, one or more determination methods may be adopted to judge whether the test abnormal keyword exists, according to certain embodiments.

According to one embodiment, the process 5206 includes: if the test abnormal keyword exists in the test log according to the keyword identification, extracting information associated with the abnormal keyword in the test log and taking the information as abnormal information. For example, the abnormal information can be saved through copying, transferring, dumping, etc.

According to another embodiment, the process S207 includes: displaying the extracted abnormal information in an abnormity display window. For example, the information associated with the abnormal keyword in the test log extracted in the process 5206 is taken as abnormal information which is displayed to the user.

According to certain embodiments, the test demand information is assembled to generate the test command line for testing an application, and abnormal information in the test log is extracted based on keyword identification. For example, an abnormal situation of the relevant application program is obtained more quickly, accurately and timely. Thus, it saves time that often needs to be spent in manually determining abnormal information of an application program in the test from a log that includes multiple application programs, avoids omission of the abnormal information, and facilitates improvement of the application program, according to some embodiments. For example, a user can quickly and conveniently set the test demand information via the user interface, and needs not know a specific command line format, so that the operations may be simple and easy.

Figure 3:
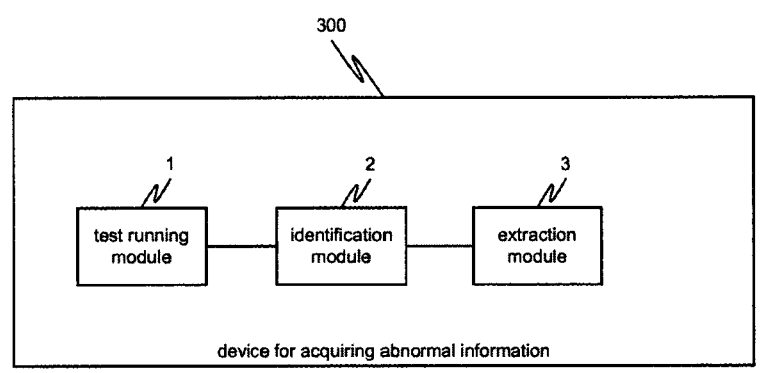
FIG. 3 is a simplified diagram showing a device for acquiring abnormal information according to one embodiment of the present invention.

FIG. 3 is a simplified diagram showing a device for acquiring abnormal information according to one embodiment of the present invention. The diagram is merely an example, which should not unduly limit the scope of the claims. One of ordinary skill in the art would recognize many variations, alternatives, and modifications. The device 300 includes a test running module 1, an identification module 2, and an extraction module 3.

According to one embodiment, the device 300 is arranged in an intelligent terminal, such as a smart phone, a tablet computer, a smart wearable device, etc. For example, the device 300 is arranged in one or more servers configured to test an application program of an intelligent terminal, so as to test a created application program and automatically extract abnormal information in a testing process.

According to another embodiment, the test running module 1 is configured to generate a test command line based on at least information associated with test demand information and run the generated test command line to send a test instruction to execute a test of a condition associated with the demand information. For example, the identification module 2 is configured to monitor a test log and perform keyword identification on the test log. In another example, the extraction module 3 is configured to, in response to one or more test abnormal keywords existing in the test log based on at least information associated with the keyword identification, extract abnormal information associated with the abnormal keywords from the test log.

According to yet another embodiment, the test running module 1 assembles the test demand information input by a user based on an existing common command line tool. For example, the user can be prompted to input the corresponding test demand information via a human-computer interaction interface. In another example, if a test mode based on a Monkey command line tool is adopted, one or more input boxes (e.g., corresponding to test time, test object, interval time between events, event proportion, etc.) are provided for a user to directly input corresponding information. The Monkey command line tool is used to send a random user event flow to perform a pressure test on an application program being developed, according to some embodiments.

According to some embodiments, after the corresponding test command line is obtained by assembling the test demand information, the test running module 1 can send out the test instruction in a manner of calling the corresponding command line tool to execute the test of the condition indicated by the demand information. For example, the tested application program is enabled to execute an operation and respond based on the user event flow corresponding to the demand information of the user. As an example, in a testing process of the application program, tested relevant log information is recorded in a log, such as a Logcat log including log information associated with an Android platform, a Monkey log, an ANR log, etc. In another example, the identification module 2 identify keywords configured to record information in the logs in real time or at a short time interval, and the keywords are preset for representing abnormal information recorded in the logs when abnormity occurs during the testing process of a target application program, so that abnormal information of the target application program during the test can be extracted out from all types of logs conveniently.

According to certain embodiments, the extraction module 3 can extract and save information (e.g., data, message) including the abnormal keywords as abnormal information. For example, as for a Logcat log, some abnormal keywords can be preset. When the identification module 2 identifies that a preset abnormal keyword included in a log including the process name of a currently tested target application program exists in the Logcat log, the extraction module 3 takes information including the keyword as abnormal information of the target application program, extracts the abnormal information and saves in a form of C-layer abnormal information into a database. In another example, as for a Monkey log, a "CRASH" field is taken as a keyword. When the identification module 2 identifies that a "CRASH" field including the process name of the currently tested target application program exists, the extraction module 3 takes the "CRASH" field as abnormal information of the target application program, and saves the "CRASH" field in a form of java-layer abnormal information into the database. In yet another example, as for an ANR log, an ANR field is taken as an abnormal keyword. When the identification module 2 identifies that an ANR field including the process name of the currently tested target application program exists, the extraction module 3 takes the ANR field as abnormal information of the target application program, exports a relevant anr file in a terminal, takes the anr file as abnormal information and saves in a form of ANR into the database. In yet another embodiment, after the abnormal information is extracted or the test is completed, acquired information can be displayed to the user via a display interface.

According to certain embodiments, the test demand information is assembled to generate the test command line for testing an application, and abnormal information in the test log is extracted based on keyword identification. For example, an abnormal situation of the relevant application program is obtained more quickly, accurately and timely. Thus, it saves time that often needs to be spent in manually determining abnormal information of an application program in the test from a log that includes multiple application programs, avoids omission of the abnormal information, and facilitates improvement of the application program, according to some embodiments.

Figure 4:
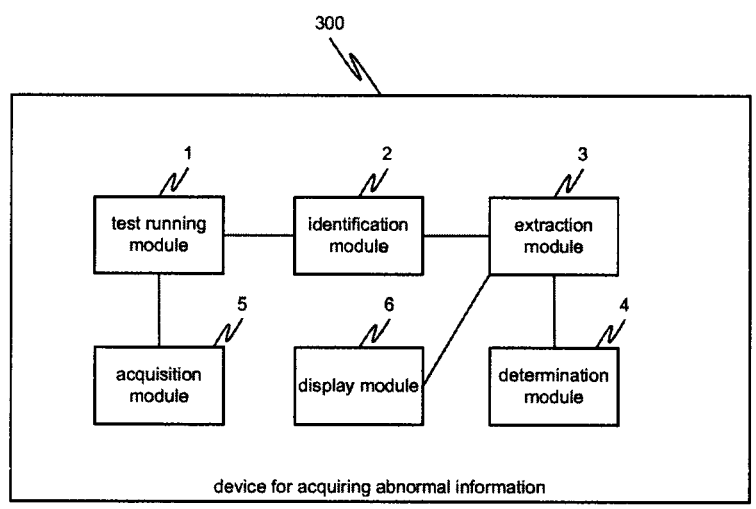
FIG. 4 is a simplified diagram showing a device for acquiring abnormal information according to another embodiment of the present invention.

FIG. 4 is a simplified diagram showing a device for acquiring abnormal information according to another embodiment of the present invention. The diagram is merely an example, which should not unduly limit the scope of the claims. One of ordinary skill in the art would recognize many variations, alternatives, and modifications.

According to one embodiment, the device 300 further includes: a determination module 4 configured to: in response to one or more first keywords indicating abnormality being identified in the test log based on at least information associated with the keyword identification, judge whether the one or more first keywords are generated by execution of the test of the condition associated with the demand information; and in response to the one or more first keywords being generated by execution of the test of the condition associated with the demand information, determine that the one or more test abnormal keywords exist in the test log.

Figure 5:
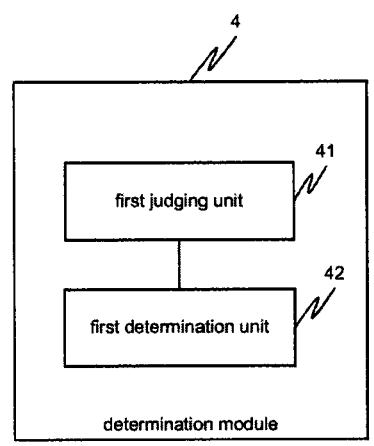
FIG. 5 is a simplified diagram showing a determination module as part of the device as shown in FIG. 4 according to one embodiment of the present invention.

FIG. 5 is a simplified diagram showing a determination module as part of the device as shown in FIG. 4 according to one embodiment of the present invention. The diagram is merely an example, which should not unduly limit the scope of the claims. One of ordinary skill in the art would recognize many variations, alternatives, and modifications.

According to one embodiment, for processing a Logcat log, the determination module 4 includes: a first judging unit 41 configured to, in response to the test log including a Logcat log, judge whether one or more abnormal information keywords exist in the Logcat log; and in response to the abnormal information keywords existing in the Logcat log, judge whether the one or more first keywords are generated by execution of the test of the condition associated with the demand information. For example, the determination module 4 further includes: a first determination unit 42 configured to, in response to the one or more first keywords being generated by execution of the test of the condition associated with the demand information, determine that the test abnormal keywords exist in the test log.

Figure 6:
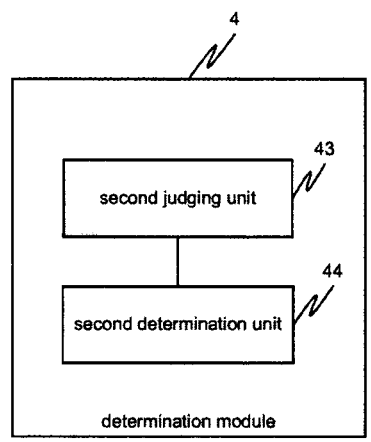
FIG. 6 is a simplified diagram showing a determination module as part of the device as shown in FIG. 4 according to another embodiment of the present invention.

FIG. 6 is a simplified diagram showing a determination module as part of the device as shown in FIG. 4 according to another embodiment of the present invention. The diagram is merely an example, which should not unduly limit the scope of the claims. One of ordinary skill in the art would recognize many variations, alternatives, and modifications.

According to one embodiment, for processing a Monkey log, the determination module 4 includes: a second judging unit 43 configured to: in response to the test log including a Monkey log, judge whether a CRASH field exists in the Monkey log; and in response to the CRASH field existing in the Monkey log, judge whether the CRASH field is generated by execution of the test of the condition associated with the demand information. For example, the determination module 4 further includes: a second determination unit 44 configured to, in response to the CRASH field being generated by execution of the test of the condition associated with the demand information, determine that the test abnormal keywords exist in the test log.

Figure 7:
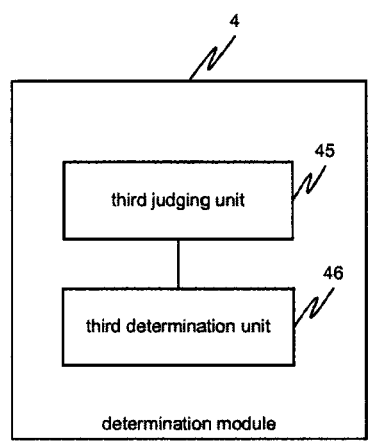
FIG. 7 is a simplified diagram showing a determination module as part of the device as shown in FIG. 4 according to yet another embodiment of the present invention.

FIG. 7 is a simplified diagram showing a determination module as part of the device as shown in FIG. 4 according to yet another embodiment of the present invention. The diagram is merely an example, which should not unduly limit the scope of the claims. One of ordinary skill in the art would recognize many variations, alternatives, and modifications.

According to one embodiment, for processing an ANR log, the determination module 4 includes: a third judging unit 45 configured to: in response to the test log including an ANR log, judge whether an ANR field indicating an abnormal response exists in the ANR log; and in response to an ANR field indicating an abnormal response existing in the ANR log, judge whether the ANR field is generated by execution of the test of the condition associated with the demand information. For example, the determination module 4 further includes: a third determination unit 46 configured to, in response to the ANR field being generated by execution of the test of the condition associated with the demand information, determine that the test abnormal keywords exist in the test log.

According to some embodiments, the first judging unit 41, the second judging unit 43 and the third judging unit 45 judge whether the corresponding abnormal information is generated due to execution of the test of the condition indicated by the demand information by judging whether the abnormal information includes the process name of a currently tested target application program specifically. For example, if the abnormal information includes the process name of a currently tested target application program, the abnormal information is determined to be generated due to execution of the test of the condition indicated by the demand information. Otherwise, the abnormal information may be abnormal information of other application programs in a terminal system, and is not required to be extracted. The determination module 4 can include one or more units as shown in FIG. 5—FIG. 7 to realize acquisition of abnormal information of different logs, according to some embodiments.

Referring to FIG. 4, the device 300 further includes: an acquisition module 5 configured to acquire the test demand information input in a demand input box by a user, wherein the test demand information includes one or more of: test time information, test object information, interval information and event proportion information, and a display module 6 configured to display the extracted abnormal information in an abnormity display window, according to certain embodiments. For example, the acquisition module 5 acquires the test information input by the user via a set user interface that includes a prompt interface, so that the display module 6 can subsequently display abnormal information of a tested target application program in the interface. As an example, the prompt interface includes a single interface.

According to certain embodiments, the test demand information is assembled to generate the test command line for testing an application, and abnormal information in the test log is extracted based on keyword identification. For example, an abnormal situation of the relevant application program is obtained more quickly, accurately and timely. Thus, it saves time that often needs to be spent in manually determining abnormal information of an application program in the test from a log that includes multiple application programs, avoids omission of the abnormal information, and facilitates improvement of the application program, according to some embodiments. For example, a user can quickly and conveniently set the test demand information via the user interface, and needs not know a specific command line format, so that the operations may be simple and easy.

According to one embodiment, a method is provided for acquiring abnormal information. For example, a test command line is generated using one or more data processors based on at least information associated with test demand information; the generated test command line is run using the data processors to send a test instruction to execute a test of a condition associated with the demand information; a test log is monitored using the data processors; keyword identification is performed using the data processors on the test log; and in response to one or more test abnormal keywords existing in the test log based on at least information associated with the keyword identification, abnormal information associated with the abnormal keywords is extracted using the data processors from the test log. For example, the method is implemented according to at least FIG. 1 and/or FIG. 2.

According to another embodiment, a device for acquiring abnormal information includes: a test running module configured to generate a test command line based on at least information associated with test demand information and run the generated test command line to send a test instruction to execute a test of a condition associated with the demand information; an identification module configured to monitor a test log and perform keyword identification on the test log; and an extraction module configured to, in response to one or more test abnormal keywords existing in the test log based on at least information associated with the keyword identification, extract abnormal information associated with the abnormal keywords from the test log. For example, the device is implemented according to at least FIG. 3 and/or FIG. 4.

According to yet another embodiment, an intelligent terminal includes a device for acquiring abnormal information. The device includes: a test running module configured to generate a test command line based on at least information associated with test demand information and run the generated test command line to send a test instruction to execute a test of a condition associated with the demand information; an identification module configured to monitor a test log and perform keyword identification on the test log; and an extraction module configured to, in response to one or more test abnormal keywords existing in the test log based on at least information associated with the keyword identification, extract abnormal information associated with the abnormal keywords from the test log. For example, the terminal is implemented according to at least FIG. 3 and/or FIG. 4.

According to yet another embodiment, a non-transitory computer readable storage medium includes programming instructions for acquiring abnormal information. The programming instructions are configured to cause one or more data processors to execute certain operations. For example, a test command line is generated based on at least information associated with test demand information; the generated test command line is run to send a test instruction to execute a test of a condition associated with the demand information; a test log is monitored; keyword identification is performed on the test log; and in response to one or more test abnormal keywords existing in the test log based on at least information associated with the keyword identification, abnormal information associated with the abnormal keywords is extracted from the test log. For example, the storage medium is implemented according to at least FIG. 1 and/or FIG. 2.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor-implemented method for acquiring abnormal information, the method comprising:
   generating, using one or more data processors, a test command line based on at least information associated with test demand information;
   running, using the one or more data processors, the generated test command line to send a test instruction to execute a test of a condition associated with the test demand information;
   determining, using the one or more data processors, whether a test log includes a keyword preset for representing abnormal information to be recorded in the test log when abnormity occurs; and
   in response to the one or more data processors determining that the test log includes the keyword, extracting from the test log, using the one or more data processors, the abnormal information represented by the keyword.

2. The method of claim 1, further comprising:
   in response to the one or more data processors determining that the test log includes the keyword, determining, using the one or more data processors, whether the keyword is associated with the test demand information.

3. The method of claim 2, the test log including a Logcat log, the keyword being preset for representing abnormal information to be recorded in the Logcat log when abnormity occurs during execution of the test of the condition associated with the test demand information.

4. The method of claim 2, the test log including a Monkey log, the keyword including a CRASH field generated by execution of the test of the condition associated with the test demand information.

5. The method of claim 2, the test log including an application not responding (ANR) log, the keyword including an ANR field generated by execution of the test of the condition associated with the test demand information.

6. The method of claim 1, further comprising:
acquiring the test demand information input in a demand input box by a user, wherein the test demand information includes one or more of: test time information, test object information, interval information and event proportion information.

7. The method of claim 6, further comprising:
displaying the extracted abnormal information in an abnormity display window.

8. A device for acquiring abnormal information, the device comprising: a processor
a test running module configured to generate a test command line based on at least information associated with test demand information and run the generated test command line to send a test instruction to execute a test of a condition associated with the test demand information;
an identification module configured to determine whether a test log includes a keyword preset for representing abnormal information to be recorded in the test log when abnormity occurs; and
an extraction module configured to, in response to the identification module determining that the test log includes the keyword, extract from the test log the abnormal information represented by the keyword.

9. The device of claim 8, further comprising:
a determination module configured to:
in response to the identification module determining that the test log includes the keyword, determine whether the keyword is associated with the test demand information.

10. The device of claim 9, the test log including a Logcat log, the keyword being preset for representing abnormal information to be recorded in the Logcat log when abnormity occurs during execution of the test of the condition associated with the test demand information.

11. The device of claim 9, the test log including a Monkey log, the keyword including a CRASH field generated by execution of the test of the condition associated with the test demand information.

12. The device of claim 9, the test log including an application not responding (ANR) log, the keyword including an ANR field generated by execution of the test of the condition associated with the test demand information.

13. The device of claim 8, further comprising:
an acquisition module configured to acquire the test demand information input in a demand input box by a user, wherein the test demand information includes one or more of: test time information, test object information, interval information and event proportion information.

14. The device of claim 13, further comprising:
a display module configured to display the extracted abnormal information in an abnormity display window.

15. The device of claim 9, further comprising:
one or more data processors; and
a computer-readable storage medium;
wherein one or more of the test running module, the identification module, and the extraction module are stored in the storage medium and configured to be executed by the one or more data processors.

16. An intelligent terminal comprising:
a device for acquiring abnormal information including: a processor
a test running module configured to generate a test command line based on at least information associated with test demand information and run the generated test command line to send a test instruction to execute a test of a condition associated with the test demand information;
an identification module configured to determine whether a test log includes a keyword preset for representing abnormal information to be recorded in the test log when abnormity occurs; and
an extraction module configured to, in response to the identification module determining that the test log includes the keyword, extract from the test log the abnormal information represented by the keyword.

17. A non-transitory computer readable storage medium comprising programming instructions for acquiring abnormal information, the programming instructions configured to cause one or more data processors to execute operations comprising:
generating a test command line based on at least information associated with test demand information;
running the generated test command line to send a test instruction to execute a test of a condition associated with the demand information;
determining whether a test log includes a keyword preset for representing abnormal information to be recorded in the test log when abnormity occurs; and
in response to determining that the test log includes the keyword, extracting from the test log the abnormal information represented by the keyword.

18. The method of claim 1, wherein the extracting comprises saving the abnormal information through copying, transferring, or dumping the abnormal information into a database.

19. The device of claim 8, wherein the extracting comprises saving the abnormal information through copying, transferring, or dumping the abnormal information into a database.

* * * * *